(12) United States Patent
Longman et al.

(10) Patent No.: US 10,794,991 B2
(45) Date of Patent: Oct. 6, 2020

(54) TARGET DETECTION BASED ON CURVE DETECTION IN RANGE-CHIRP MAP

(71) Applicant: GM Global Technology Operations LLC, Detroit, MI (US)

(72) Inventors: Oren Longman, Tel Aviv (IL); Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 388 days.

(21) Appl. No.: 15/803,032

(22) Filed: Nov. 3, 2017

(65) Prior Publication Data

US 2019/0137602 A1    May 9, 2019

(51) Int. Cl.
| | |
|---|---|
| *G01S 7/35* | (2006.01) |
| *G01S 13/32* | (2006.01) |
| *G01S 13/42* | (2006.01) |
| *G01S 13/931* | (2020.01) |

(52) U.S. Cl.
CPC ............. *G01S 7/352* (2013.01); *G01S 13/32* (2013.01); *G01S 13/42* (2013.01); *G01S 13/931* (2013.01); *G01S 2007/356* (2013.01)

(58) Field of Classification Search
None
See application file for complete search history.

(56) References Cited

U.S. PATENT DOCUMENTS

| | | | |
|---|---|---|---|
| 2011/0025546 A1* | 2/2011 | Cook | G01S 7/2923 342/22 |
| 2012/0093359 A1* | 4/2012 | Kurien | G01S 13/726 382/103 |
| 2015/0301169 A1* | 10/2015 | De Pasquale | G01S 13/88 342/146 |
| 2015/0323660 A1* | 11/2015 | Hampikian | G01S 13/584 342/109 |

* cited by examiner

*Primary Examiner* — Whitney Moore
(74) *Attorney, Agent, or Firm* — Cantor Colburn LLP

(57) ABSTRACT

A system and method to perform target detection includes transmitting frequency modulated continuous wave (FMCW) pulses as chirps from a radar system. The method also includes receiving reflections resulting from the chirps, and processing the reflections to obtain a range-chirp map for each beam associated with the transmitting. Curve detection is performed on the range-chirp map for each beam, and one or more targets is detected based on the curve detection.

20 Claims, 6 Drawing Sheets

TARGET DETECTION BASED ON CURVE DETECTION IN RANGE-CHIRP MAP

INTRODUCTION

The subject disclosure relates to target detection based on curve detection in a range-chirp map.

Radar systems transmit energy in the radio frequency (RF) band and process received signals that result from targets reflecting the RF energy. Radar systems are used to detect and track targets in a wide variety of applications. Vehicles (e.g., automobiles, trucks, construction equipment, farm equipment, automated factory equipment), for example, are increasingly outfitted with sensor systems such as radar systems that facilitate enhanced or automated vehicle operation. For example, target detection and tracking by the radar system may be used for autonomous operation, adaptive cruise control, automated steering or braking, or driver warning systems. In a frequency modulated continuous wave (FMCW) radar system, a series of pulses with increasing or decreasing frequencies, referred to as chirps, may be transmitted. A shift in the frequencies of received reflections from the transmitted frequencies results from relative movement of the reflecting target and is referred to as the Doppler shift. Traditionally, information from the FMCW radar system is considered by using a range-Doppler map. In a range-Doppler map, range is along one axis, and Doppler is along a perpendicular axis. The traditional detection technique using a range-Doppler map may be ineffective in detecting weaker targets and requires separate target detection and classification steps. Accordingly, it is desirable to provide target detection based on curve detection in a range-chirp map.

SUMMARY

In one exemplary embodiment, a method of performing target detection includes transmitting frequency modulated continuous wave (FMCW) pulses as chirps from a radar system. The method also includes receiving reflections resulting from the chirps, and processing the reflections to obtain a range-chirp map for each beam associated with the transmitting. The method further includes performing curve detection on the range-chirp map for each beam, and detecting one or more targets based on the curve detection.

In addition to one or more of the features described herein, the processing the reflections includes performing an analog-to-digital conversion on the reflections to obtain samples.

In addition to one or more of the features described herein, the processing the reflections further includes obtaining a range-chirp map for each channel of the radar system.

In addition to one or more of the features described herein, the obtaining the range-chirp map includes performing a fast Fourier transform to obtain an indication of energy distribution of the reflections at each detectable range associated with each of the chirps.

In addition to one or more of the features described herein, the processing the reflections further includes performing digital beamforming on each range-chirp map for each channel to obtain the range-chirp map for each beam.

In addition to one or more of the features described herein, the performing the digital beamforming includes determining an azimuth angle to each of the one or more targets.

In addition to one or more of the features described herein, the performing the curve detection includes using a Hough transform on the range-chirp map for each beam.

In addition to one or more of the features described herein, the performing the curve detection includes processing the range-chirp map for each beam iteratively.

In addition to one or more of the features described herein, the method also includes performing a Doppler FFT on candidate curves obtained from the performing the curve detection.

In addition to one or more of the features described herein, the detecting the one or more targets is based on applying a threshold to a result of the Doppler FFT.

In another exemplary embodiment, a system to perform target detection includes a radar system to transmit frequency modulated continuous wave (FMCW) pulses as chirps from a radar system and receive reflections resulting from the chirps. The system also includes processing circuitry to process the reflections to obtain a range-chirp map for each beam associated with the transmitting, perform curve detection on the range-chirp map for each beam, and detect one or more targets based on the curve detection.

In addition to one or more of the features described herein, the processing circuitry processes the reflections based on performing an analog-to-digital conversion on the reflections to obtain samples.

In addition to one or more of the features described herein, the processing circuitry processes the reflections based on obtaining a range-chirp map for each channel of the radar system.

In addition to one or more of the features described herein, the processing circuitry obtains the range-chirp map based on performing a fast Fourier transform to obtain an indication of energy distribution of the reflections at each detectable range associated with each of the chirps.

In addition to one or more of the features described herein, the processing circuitry processes the reflections based on performing digital beamforming on each range-chirp map for each channel to obtain the range-chirp map for each beam.

In addition to one or more of the features described herein, the processing circuitry performs the curve detection based on using a Hough transform on the range-chirp map for each beam.

In addition to one or more of the features described herein, the processing circuitry performs the curve detection based on processing the range-chirp map for each beam iteratively.

In addition to one or more of the features described herein, the processing circuitry performs a Doppler FFT on candidate curves obtained from performing the curve detection.

In addition to one or more of the features described herein, the processing circuitry detects the one or more targets based on applying a threshold to a result of the Doppler FFT.

In addition to one or more of the features described herein, the radar system and the processing circuitry are in a vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
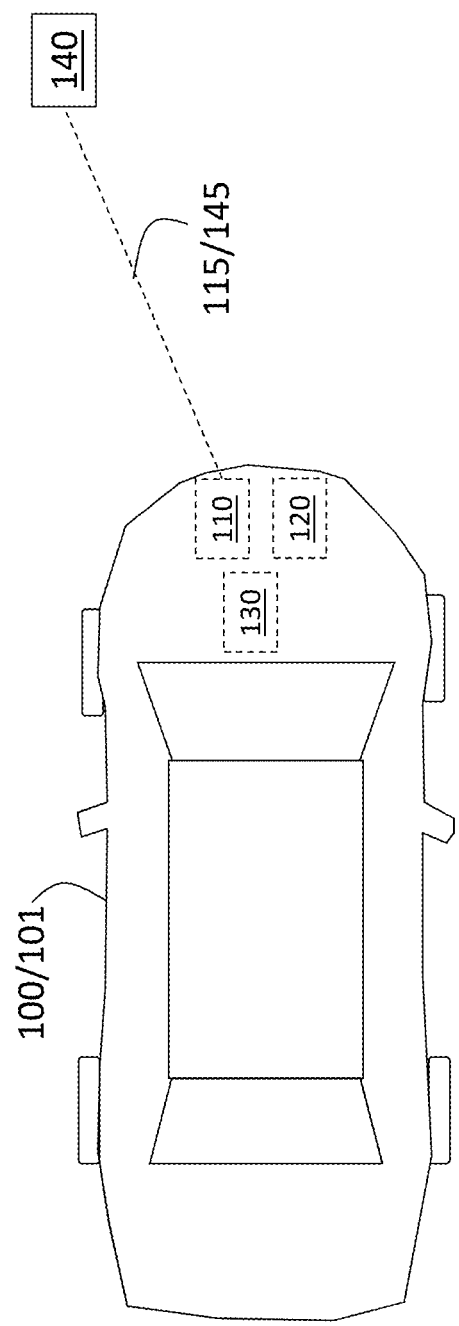
FIG. 1 is a block diagram of a processing circuitry to perform target detection based on curve detection in a range-chirp map obtained with a radar system in a vehicle according to one or more embodiments.

The following description is merely exemplary in nature and is not intended to limit the present disclosure, its application or uses. It should be understood that throughout the drawings, corresponding reference numerals indicate like or corresponding parts and features.

As previously noted, an FMCW radar transmits chirps and develops a range-Doppler map from the received reflections. The typical processing of received reflections includes performing an analog-to-digital conversion and a fast Fourier transform (FFT) with respect to range (referred to as a range FFT). The result of the range FFT is an indication of energy distribution across ranges detectable by the radar for each chirp that is transmitted, and there is a different range FFT associated with each receive channel and each transmit channel. Thus, the total number of range FFTs is a product of the number of transmitted chirps and the number of receive channels.

A Doppler FFT is then performed on the range FFT result. The Doppler FFT is also a known process in radar detection and is used to obtain a range-Doppler map per receive channel. For each receive channel and transmit channel pair, all the chirps are processed together for each range bin of the range-chip map (obtained with the range FFT). The result of the Doppler FFT, the range-Doppler map, indicates the relative velocity of each detected target along with its range. The number of Doppler FFTs is a product of the number of range bins and the number of receive channels.

Digital beamforming results in a range-Doppler (relative velocity) map per beam. Digital beamforming is also a known process and involves obtaining a vector of complex scalars from the vector of received signals and the matrix of actual received signals at each receive element for each angle of arrival of a target reflection. Digital beamforming provides an azimuth angle to each of the detected targets based on a thresholding of the complex scalars of the obtained vector. The outputs that are ultimately obtained from processing the received signals are range, Doppler, azimuth, elevation, and amplitude of each target.

As also noted, detection based on the range-Doppler map has limitations with regard to detecting weaker targets, for example. As such, according to one or more embodiments, the range-chirp map obtained from the range FFT is used in the detection process prior to performing the Doppler FFT. Further, curve detection is performed on the range-chirp map prior to performing the Doppler FFT. As a result, curves produced by the curve detection undergo Doppler FFT, and curves with Doppler values that pass a detection threshold are used to detect targets. This change in the detection algorithm facilitates the detection of weaker targets and the recognition of multiple returns from the same target as being associated with a single object.

In accordance with an exemplary embodiment, FIG. 1 is a block diagram of processing circuitry 120 to perform target detection based on curve detection in a range-chirp map obtained with a radar system 110 in a vehicle 100. The vehicle 100 is an automobile 101 in the exemplary case shown in FIG. 1. The radar system 110 is a known FMCW radar that includes one or more transmitters and one or more receivers in addition to other known components. The transmission 115 of one chirp and a reflection 145 resulting from a target 140 are indicated in FIG. 1. The transmission 115 is a frequency modulated continuous wave signal. The chirp frequency of the transmission 115 is shifted by the target 140 in the reflection 145 according to the Doppler effect. The amount of the shift is a function of the range from the radar system 110 to the target 140.

The processing circuitry 120 may be part of the radar system 110 or may be part of a separate controller. In addition to obtaining information from the radar system 110, the processing circuitry 120 provides target information to other vehicle systems 130 such as, for example, a collision avoidance system, adaptive cruise control system, automatic braking system, or autonomous driving system. The processing circuitry 120 may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
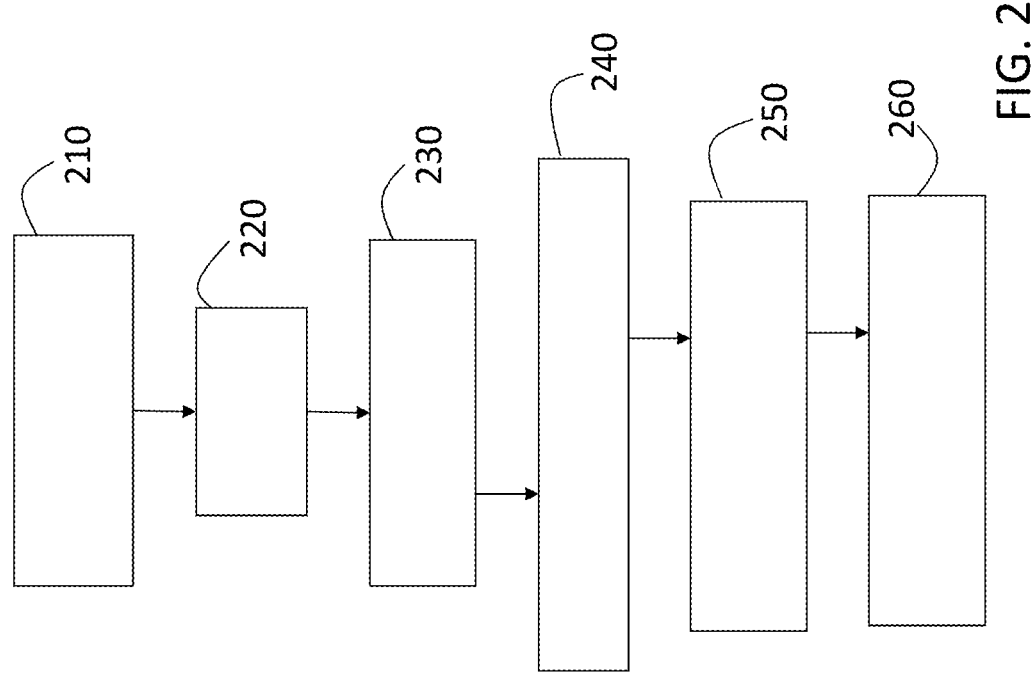
FIG. 2 is a process flow of a method of performing target detection based on curve detection according to one or more embodiments.

FIG. 2 is a process flow of a method of performing target detection based on curve detection according to one or more embodiments. At block 210, receiving reflections 145 at the radar system 110 is based on transmission 115. According to alternate embodiments, the radar system 110 may be a multi-input multi-output (MIMO) system with more than one transmit channel and more than one receive channel or may include only one transmit or receive channel. Performing an analog-to-digital conversion (ADC), at block 220, of the reflections 145 results in samples of the reflections 145.

Figure 3:
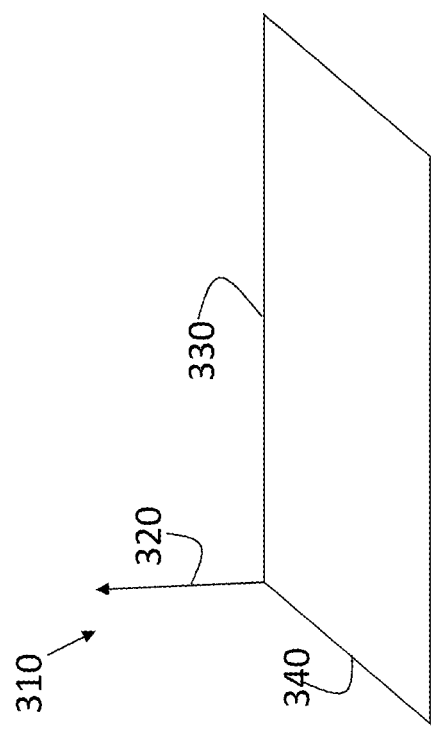
FIG. 3 shows components of a range-chirp map obtained according to one of the processes shown in FIG. 2.

At block 230, the processes include performing range FFT on the samples output by the ADC at block 220. Because a specific shift in the frequency of the reflection 145 as compared with the transmission 115 is associated with a specific range to the target 140, the frequency of each received reflection 145 can be associated with a range. As previously noted, the process of performing a range FFT is known. FIG. 3 shows components of a range-chirp map 310 obtained according to the process at block 230. The output of block 230 is a range-chirp map 310 per receive channel. That is, for each receive channel, energy is shown for each range bin resulting from each chirp. In FIG. 3, axis 320 indicates energy level, axis 330 indicates the range bin, and axis 340 indicates the chirp index.

According to the one or more embodiments herein, digital beamforming is performed at this stage rather than a Doppler FFT, as in traditional radar systems. Performing digital beamforming, at block 240, refers to the known process of estimating the angle to the target 140 from the single transmitter or the center of a transmitter array. As previously noted, the digital beamforming, at block 240, results in a range-chirp map 310 per beam rather than per receive channel.

Performing curve detection, at block 250, is further detailed with reference to FIG. 4. The result of the curve detection, performed at block 250, is provided as information, at block 260, to other vehicle systems 130, for example. The result includes range, Doppler, azimuth, elevation, and amplitude.

Figure 4:
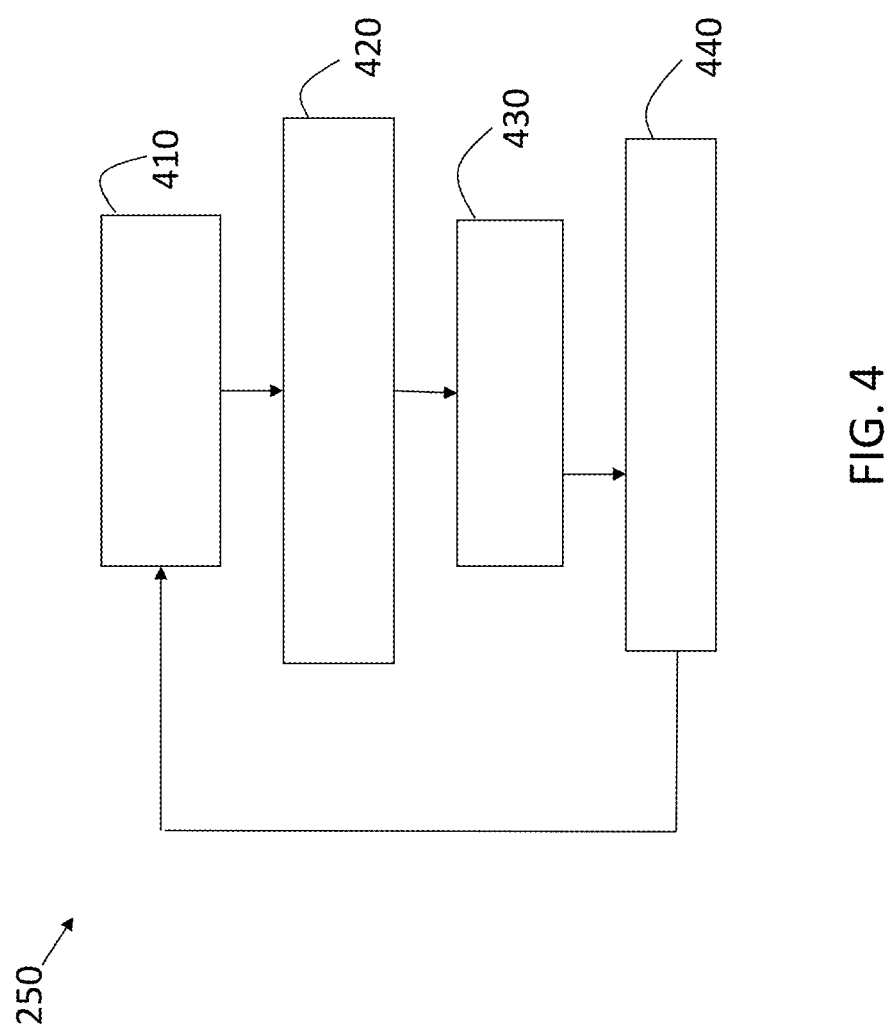
FIG. 4 is a process flow detailing the curve detection process according to one or more embodiments.
Figure 5:
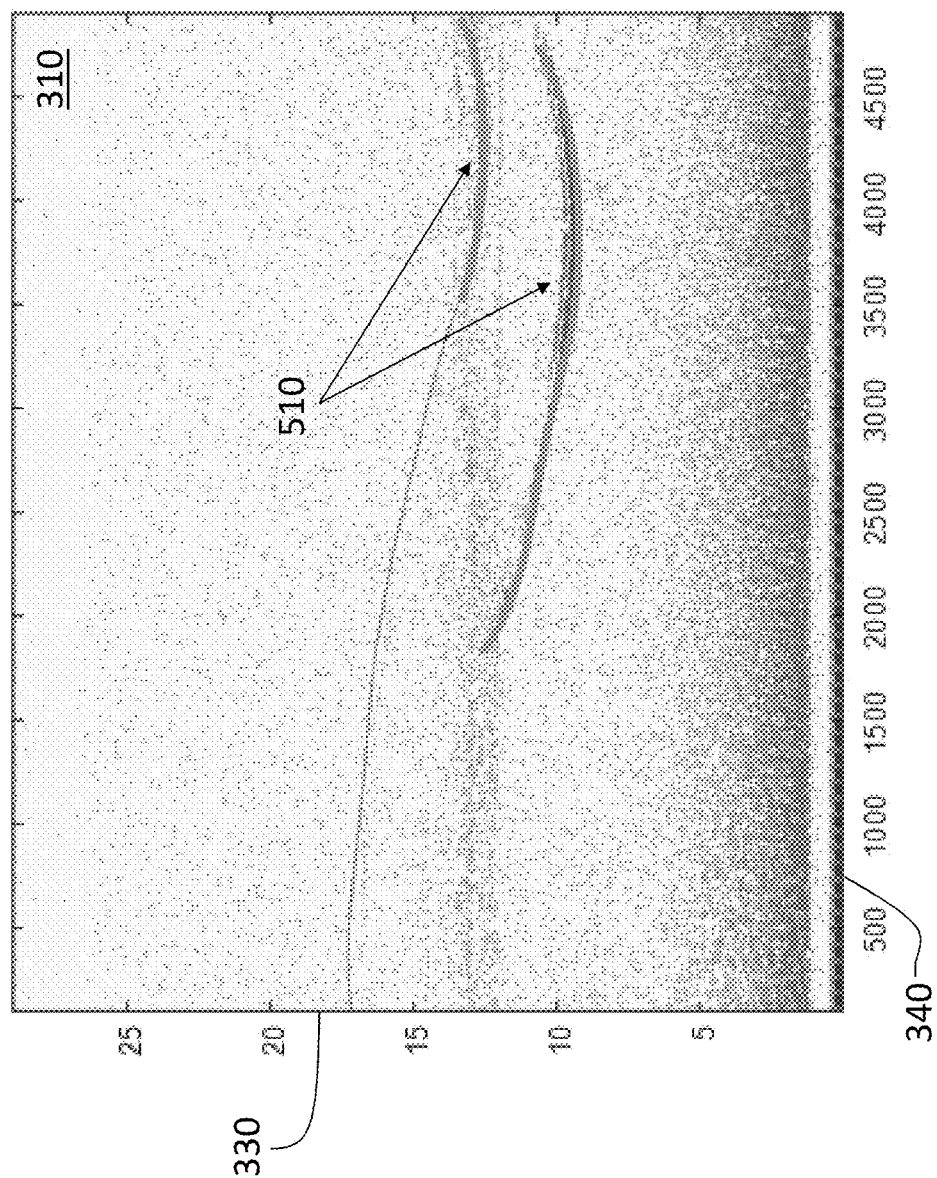
FIG. 5 depicts exemplary curves that are detected in an exemplary range-chirp map according to one or more embodiments.
Figure 6:
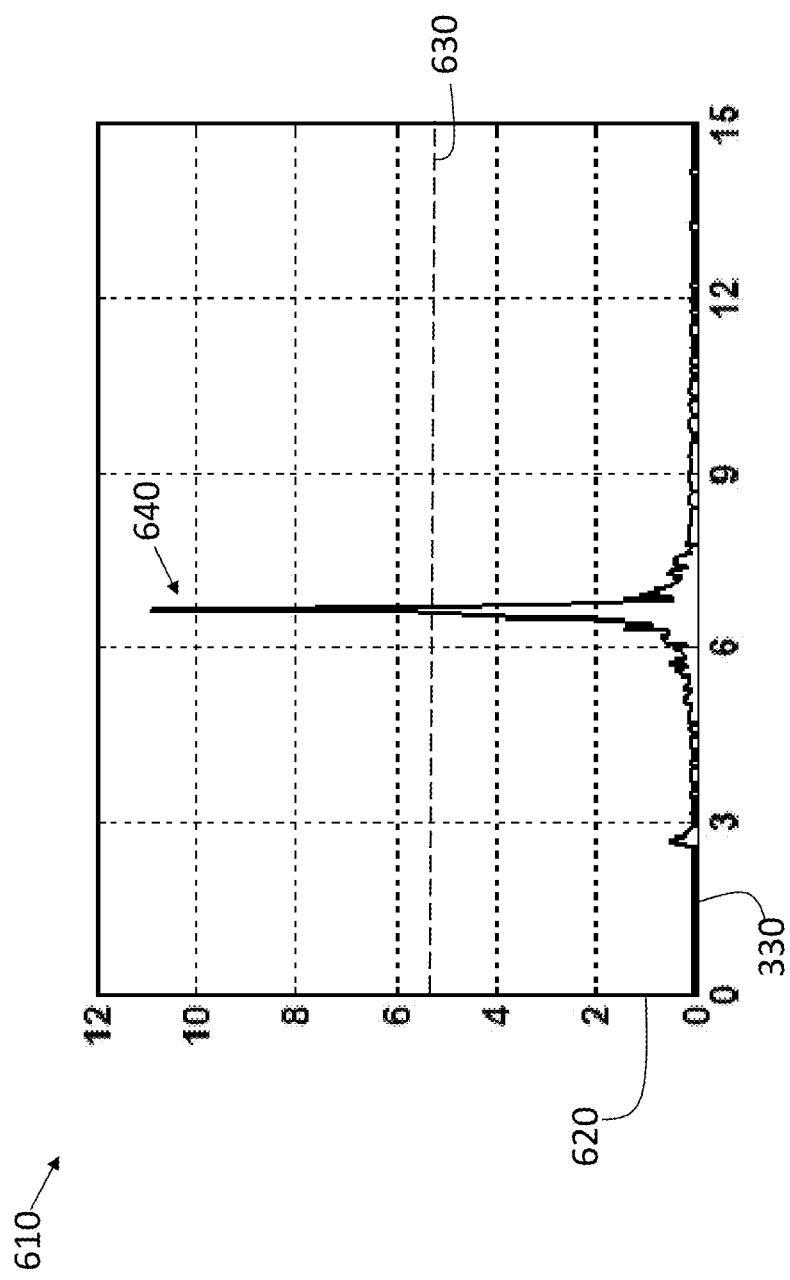
FIG. 6 shows an exemplary curve spectrum resulting from performing a Doppler FFT of the curves detected according to one of the processes shown in FIG. 4.

FIG. 4 is a process flow detailing the curve detection process, at block 250, according to one or more embodiments. The processes shown in FIG. 4 are performed iteratively per beam on each range-chirp map 310. At block 410, selecting a beam is done for each iteration. At block 420, performing a Hough curve detection refers to fitting the curve 510 that best fits the shape in the range-chirp map 310 for the selected beam. FIG. 5 depicts exemplary curves 510 that are detected in an exemplary range-chirp map 310. The axis 330 indicates range, the axis 340 indicates chirp index, and energy level is indicated by the shading. The process at block 420 results in candidate curves 510 (FIG. 5). Performing the known curve detection technique at this stage differs from using the range-Doppler map in the traditional detection technique, and the physical property of the target 140 is represented by a curve 510 rather than a dot. The true range rate of the target 140 over time may be obtained using the detection according to the processes shown in FIG. 4, whereas range rate is obtained based on additional processing beyond the target detection processing according to traditional target detection methods that use the range-Doppler map. Performing Doppler FFT, at block 430, following the Hough curve detection, at block 420, results in a curve spectrum 610 (FIG. 6). As previously noted, Doppler FFT provides an indication of the relative velocity of each target.

FIG. 6 shows an exemplary curve spectrum 610 resulting from performing a Doppler FFT, at block 430, of the curves 510 (from the range-chirp map 310) detected according to the process at block 420. Range bin is indicated by axis 330 and Doppler is indicated by axis 620. At block 440, applying a threshold 630 to the curve spectrum 610 obtained from the Doppler FFT, at block 430, facilitates the target detection for the selected beam. An exemplary target frequency response 640 is indicated in FIG. 6.

As previously noted, the processes detailed with reference to FIGS. 2 and 4 facilitate the detection of weaker targets that may be masked by targets with higher reflectivity when traditional detection techniques based on the range-Doppler map are used. Target separation is also improved by basing detection on the range-chirp map. If the target true range rate, determined using the detection processes, does not match the target Doppler, then the target Doppler frequency is ambiguous. If a curve 510 is exactly the same as a closer curve 510, then the curve 510 is a multipath reflection. Multiple reflections 145 from the same target 140 may be recognized as being associated with the same object because they will have the same curve 510 properties. Finally, target detection and classification may be implemented jointly at block 440, according to one or more embodiments.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing target detection, the method comprising:
   transmitting frequency modulated continuous wave (FMCW) pulses as chirps from a radar system;
   receiving reflections resulting from the chirps;
   processing the reflections to obtain a range-chirp map for each beam associated with the transmitting, wherein the processing the reflections includes performing a first fast Fourier transform (FFT) on the reflections;
   performing curve detection on the range-chirp map for each beam to obtain candidate curves; and
   detecting one or more targets based on the curve detection, wherein the detecting including performing a second FFT on a result of the curve detection.

2. The method according to claim 1, wherein the processing the reflections includes performing an analog-to-digital conversion on the reflections to obtain samples.

3. The method according to claim 1, wherein the processing the reflections further includes obtaining a range-chirp map for each channel of the radar system.

4. The method according to claim 3, wherein the obtaining the range-chirp map includes performing the first FFT to obtain an indication of energy distribution of the reflections at each detectable range associated with each of the chirps.

5. The method according to claim 3, wherein the processing the reflections further includes performing digital beamforming on each range-chirp map for each channel to obtain the range-chirp map for each beam.

6. The method according to claim 5, wherein the performing the digital beamforming includes determining an azimuth angle to each of the one or more targets.

7. The method according to claim 1, wherein the performing the curve detection includes using a Hough transform on the range-chirp map for each beam.

8. The method according to claim 1, wherein the performing the curve detection includes processing the range-chirp map for each beam iteratively.

9. The method according to claim 1, wherein the performing the second FFT includes performing a Doppler FFT on the candidate curves obtained from the performing the curve detection.

10. The method according to claim 9, wherein the detecting the one or more targets is based on applying a threshold to a result of the Doppler FFT.

11. A system to perform target detection, the system comprising:
    a radar system configured to transmit frequency modulated continuous wave (FMCW) pulses as chirps from a radar system and receive reflections resulting from the chirps;
    processing circuitry configured to process the reflections to obtain a range-chirp map for each beam associated with the transmitting, wherein processing the reflections includes performing a first fast Fourier transform (FFT) on the reflections, perform curve detection on the range-chirp map for each beam to obtain candidate curves, and detect one or more targets based on the curve detection, wherein detecting the one or more targets includes performing a second FFT on a result of the curve detection.

12. The system according to claim 11, wherein the processing circuitry is configured to process the reflections based on performing an analog-to-digital conversion on the reflections to obtain samples.

13. The system according to claim 11, wherein the processing circuitry is further configured to process the reflections based on obtaining a range-chirp map for each channel of the radar system.

14. The system according to claim 13, wherein the processing circuitry is configured to obtain the range-chirp map based on the first FFT to obtain an indication of energy distribution of the reflections at each detectable range associated with each of the chirps.

15. The system according to claim 13, wherein the processing circuitry is further configured to process the reflections based on performing digital beamforming on each range-chirp map for each channel to obtain the range-chirp map for each beam.

16. The system according to claim 11, wherein the processing circuitry is configured to perform the curve detection based on using a Hough transform on the range-chirp map for each beam.

17. The system according to claim 11, wherein the processing circuitry is configured to perform the curve detection based on processing the range-chirp map for each beam iteratively.

18. The system according to claim 11, wherein the processing circuitry performing the second FFT includes performing a Doppler FFT on the candidate curves obtained from performing the curve detection.

19. The system according to claim 18, wherein the processing circuitry is configured to detect the one or more targets based on applying a threshold to a result of the Doppler FFT.

20. The system according to claim 11, wherein the radar system and the processing circuitry are in a vehicle.

* * * * *